July 28, 1936. E. AMKRAUT 2,049,241
METHOD AND APPARATUS FOR CURLING FEATHERS
Filed April 26, 1935
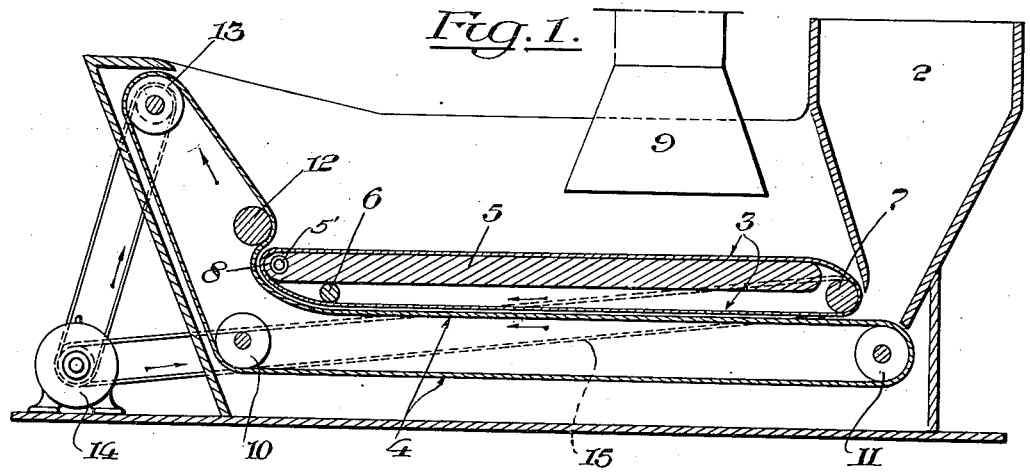
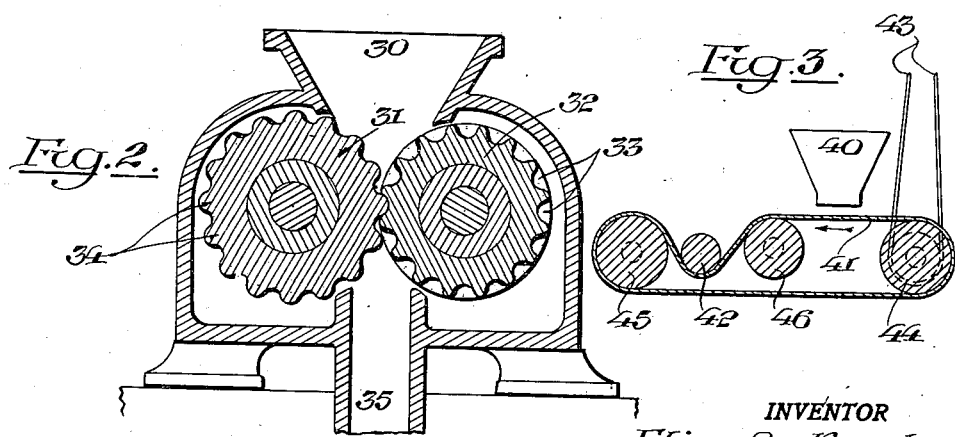
INVENTOR
Elias Amkraut
BY
ATTORNEY Patented July 28, 1936

2,049,241

UNITED STATES PATENT OFFICE 2,049,241

METHOD AND APPARATUS FOR CURLING FEATHERS

Elias Amkraut, Brooklyn, N. Y., assignor of thirty-seven and one-half per cent to Emanuel H. Licht, New York, N. Y.

Application April 26, 1935, Serial No. 18,486

6 Claims. (Cl. 223—47)

This invention has to do with the treatment of feathers such as chicken and turkey feathers for the purpose of curling them for use as a filling for bedding or upholstery, etc., the object of the invention being to provide a method and apparatus for the curling of such species of feathers whereby their use will increase the resiliency or buoyancy of the bedding or upholstery.

A further object of the invention is the provision of a method and apparatus for curling feathers such as chicken and turkey feathers which is comparatively simple, inexpensive and highly efficient to give a permanent curl to such feathers and which curl will remain notwithstanding the feathers may subsequently be subjected to steaming, sorting, moisture or washing.

As is well known, the feathers of fowl such as geese, ducks, chickens and turkeys are largely used for bedding and upholstery purposes, the body feathers only of chickens and turkeys heretofore having commonly been used for this purpose as distinguished from the wing and tail feathers which could not be used without first being crushed, broken or otherwise specially treated to soften them. Water fowl have an undercoating known as down consisting of light fluffy filaments grown from one quill point without any quill shaft. The structure of this down gives it resiliency and this is relied upon to give the necessary buoyancy or spring to articles of bedding but a down-filled article is very expensive.

Water fowl feathers have a curvature in their quill shafts, the curvature of geese feathers being greater than that of duck feathers and this natural curvature gives the necessary resiliency and buoyancy to articles of bedding and, likewise, the use of these feathers makes an article expensive.

Chicken and turkey feathers, however, do not have this natural curvature prevalent in water fowl feathers and are, therefore, not resilient and, because of their flat nature, lay more compactly. Consequently, the articles in which they are used do not have the same resiliency and buoyancy as one filled with the curled feathers of water fowl and, hence, demand a less price.

Therefore, in order to lessen the price of the article, it is the practice to mix with water fowl feathers, chicken and turkey feathers as an adulterant and to render these feathers suitable and more practical for use either alone or mixed with water fowl feathers, it has also been the practice to treat them by crushing, chopping or by a twisting process, by means of which the quill shafts are crushed and broken up to soften them, but these methods of treatment result in considerable waste, dust and shavings and are not sanitary.

Thus, the object of the present improvement is to so treat the ordinary flat or uncurled feathers such as chicken and turkey feathers that they will have a natural curl similar to water fowl feathers and I have found that, by my method of treatment, which is very simple and efficient and does not break or crush the quill shaft, the feathers remain permanently curled even though subjected to washing thereafter, to the same extent that the natural water fowl feather remains curled and I have also found that I can give any curl to water fowl feathers that may be desired and it will remain permanently therein.

By my improved method, the quills or quill shafts are curled while in their raw or original condition without subjecting them to any prior treatment for the purpose of softening, bending, breaking or crushing the quills, the heating of the feathers softening the quills or quill shafts and the pressure curling them and this curl remains therein permanently.

In practice, the feathers usually used for bed filling and upholstery are body feathers, the average length of which is about two and a half inches, and the Government specifications for such filling prohibit the use of any feathers exceeding four inches in length, such as wing and tail feathers or what are known as flight or flat feathers.

This improved method consists in subjecting the feathers to heat and pressure in any suitable way, and, in the drawing, I have shown several simple apparatuses, all embodying the same principle, that may be used to accomplish this purpose.

In the drawing accompanying and forming a part of this specification, Fig. 1 is a sectional view of one form of apparatus which may be used to carry out this improved method.

Fig. 2 is a sectional view of still another form, and

Fig. 3 is a sectional end view of another form of apparatus which may be also used in carrying out this improved method.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawing since the invention is capable of other embodiments, and that the phraseology employed is for the purpose of description and not of limitation.

In the form shown in Fig. 1, the feathers are fed from a hopper 2 to a pair of belts 3 and 4, the belt 3 being preferably of fabric or cloth or some soft material having the runs thereof guided around a plate 5 by rollers 6 and 7, the plate 5 being heated in any suitable manner as by electricity or steam coils, a suitable heating coil 5' being shown extending transversely of the front of the plate although, of course, this could be otherwise located if desired.

The other belt 4 has one run thereof in contact with the belt 3 between which the feathers are fed from the hopper 2 and around the front edge of the heated plate and as the feathers pass around the curved edge 8 of this heated plate, they are subjected to pressure and curled around the front edge of the plate. The feathers are then carried along the top of the belt until they reach a suitable instrumentality such as a suction device 9 which carries the curled feathers away from the apparatus.

In this form of the apparatus, the heated plate 5, instead of having a curved front end for the passage of the feathers therearound, may have a roller located at this point accomplishing the same purpose.

The belt 4 is suitably guided by guide rolls 10, 11, 12 and 13 and is in the form of an endless belt as is also the belt 3 and this belt 4 may be of leather or other form and power is imparted to the roll 13 from a suitable motor 14, whereby this endless belt 4 travels around the guide rollers in the manner shown.

Power may be imparted to the roller 7 by a suitable belt 15 from the motor 14 so that the two belts will travel uniformly with a pair of runs thereof in contact to carry the feathers from the hopper 2 around the curved end of the heated plate and the pressure on the feathers between the belt 4 and curved end of the heated plate together with the heat from the plate imparts a curl to the feather that remains permanently therein, giving it all the resiliency and buoyancy of a naturally curved water fowl feather so that feathers treated in this manner can be used in place of water fowl feathers without any crushing, chopping or breaking and the article can be sold at a less price and yet have all the advantages of a water fowl feather filled article.

This same process may also be used to increase, if desired, the natural curl of water fowl feathers or to give them a different curl where this is found desirable.

In the form of apparatus shown in Fig. 2, the feathers are fed from the hopper 30 to a pair of rollers 31 and 32, either or both of which are suitably heated and these rollers are provided with staggered recesses and projections, the recesses 33 being carried by one roller and the projections 34 by the other. These recesses and projections are of disk or circular form, the recesses having rounded edges, so that whether the feathers fall therebetween in the direction of their length or fall sidewise, they will, nevertheless, be curled by the pressure of the heated rollers exerted thereon and when curled, are passed from the chute 35 below the rollers.

In the form of apparatus shown in Fig. 3, the hopper 40 supplies the feathers to a belt 41 which may be of metal if desired and are fed thereby to a roller 42, being carried under and around the curved surface of the roller and thereby curled, heat being supplied either to the belt or roller as may be desired.

In this form of apparatus, the belt 41 is operated from a suitable source of power by means of a belt 43 around the pulley 44 over which the belt 41 passes, being guided by suitable rollers 45 and 46, with the roller 42 located on the top run of the belt in the manner shown.

Thus, by any of these forms of apparatus, as well as by others that could be provided, the feathers are fed around a suitable heated curved surface and by the pressure exerted on the feathers during this feeding movement, they are curved or curled in precisely the same way that the water fowl feather is curled. In fact, they may, according to the curved surface over which they pass, be given a greater or less curl, as may be desired.

Thus, by the utilization of heat and pressure in this method of treating feathers, the quill shaft of the feather may be permanently curved to any desired degree and this whether it was originally curved or not and the curl can be put into the feather either on the upper or under side thereof.

In other words, water fowl feathers usually have their curvature conforming to the body of the fowl, the concave portion being the under side and the convex the upper side of the feather but, by this process, this curvature can be reversed, if desired, provided the feather contains a quill shaft.

As is well known, curled feathers of water fowl not only, as stated, increase the resiliency but require less feathers by weight for filling any given size of pillow, etc., so that, by curling chicken or turkey feathers to give them a permanent curl by this method, I am able to utilize them as a substitute for the more expensive water fowl feathers without decreasing the resiliency or buoyancy of the article and without the necessity of using a greater quantity by weight than is required when all water fowl feathers are used and, obviously, as hereinbefore set forth, the curvature or curl of the feathers can be greatly increased over that naturally found in water fowl feathers thereby still further increasing the resiliency, buoyancy and filling capacity of the feathers, requiring that a less quantity of the feathers be used.

By this process also, only the bony quill shaft of the feather is treated by bending arcs or curvatures into such quill shaft. The fibers or filaments branching out from the quill shaft remain straight and in their original uncurled form and thus the process does not curl or form spirals in the individual fibres and filaments.

By this method also, the smaller wing and tail feathers from chickens, ducks, etc., can be advantageously used because the quill shafts can be turned into spirals forming very resilient springs whereas, heretofore, due to their straight formation and rigidity, they could not be used efficiently for bedding material without some treatment to soften them which, as before stated, is highly disadvantageous.

Furthermore, by this improved method, chicken feather filled pillows or other articles may contain substantially the same weight of material as water fowl feather filled pillows having equal curvature and require less feathers by weight than water fowl feather filled pillows which may have less curvature to their feathers, and the curl is put into the stem of the feathers without affecting the plumage or fibre of the feather in any way.

It is within the scope of my invention to subject the feathers to heat and pressure simultaneously or to first heat the feathers and then subject them to pressure while still in a heated condition and this method may be carried out by any suitable apparatus that will efficiently accomplish the purpose.

When treating unsorted water fowl feathers containing down, or a mixture of chicken and down or various kinds of feathers and down, it is not necessary to separate the down because this process will only affect feathers containing quill shafts and will not in any way injure the down, and in practice, suitable means may be used for feeding and guiding the feathers so that they will be conveyed to the pressure and heating surfaces in the direction of their length.

One of the important advantages of this improvement is that the United States does not produce sufficient water fowl feathers to supply the demand for bedding and upholstery purposes, importing, for instance, yearly about 4,000,000 pounds of Chinese feathers as compared with 1,000,000 pounds produced in this country. Consequently, manufacturers have to import duck and geese feathers mainly from China, as stated, whereas the United States has a very large surplus of chicken feathers which are exported to Europe. Therefore, it follows that, by utilizing this method, it will no longer be necessary for the manufacturers of this country to be dependent upon the supply of water fowl feathers from abroad to meet their bedding requirements.

It is a fact that, during the World War, the Government restricted the use of water fowl feathers for civilian purposes in order to insure itself of a sufficient supply for hospital purposes with the result that the manufacturers of this country were very much hampered and were unable to obtain a sufficient supply of this kind of feathers to meet their requirements and had to use inferior material for civilian purposes so that it follows that this method will enable United States manufacturers to fully meet emergency requirements, without the necessity of relying upon outside sources therefor.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. In an apparatus for curling feathers for use as bedding and upholstery filling such as chicken and turkey feathers, the combination of a supply hopper, means shaped to curl the feathers and their quills, a pair of co-operating means, one in engagement with said shaping means, means for driving said co-operating means, and means for heating said shaping means.

2. In an apparatus for curling feathers for use as bedding and upholstery filling such as chicken and turkey feathers, the combination of feather supply means, means for feeding the feathers and subjecting them including their quills to direct pressure, and means for heating the feathers, said feeding means comprising a pair of co-operating belts between which the feathers are fed and by means of which the feathers are fed into position to be curled, and means within one of said belts shaped to impart the desired curl to the feathers and effective to supply heat to the feathers during the curling thereof.

3. The method of curling feathers used as filling for bedding and upholstery and comprising chicken and turkey feathers, which consists in subjecting the feathers to direct pressure while in a heated condition around a surface shaped to impart to the quill lengthwise thereof the desired curl while the quills are in their raw or original condition, whereby the quills are permanently curled without crushing or breaking thereof or previously removing the pith therefrom.

4. An apparatus for curling chicken and turkey feathers used as filling for bedding and upholstery and comprising a pair of co-operating pressure exerting surfaces shaped to impart to the quills lengthwise thereof the desired curl while the quills are in their raw or original condition whereby the quills are permanently curled without crushing or breaking thereof or previously removing the pith therefrom, said surfaces comprising a pair of juxtaposed members having convex-concaved feather engaging surfaces, and means for heating the feathers while under pressure.

5. In an apparatus for curling chicken and turkey feathers used as filling for bedding and upholstery, the combination of feather supply means, flexible means for feeding the feathers, means shaped to impart to the quill lengthwise thereof the desired pressure and curl while the quills are in their raw or original condition whereby the quills are permanently curled without crushing or breaking thereof or previously removing the pith therefrom, and means for heating the feathers while under pressure.

6. An apparatus for curling chicken and turkey feathers used as filling for bedding and upholstery and comprising a pair of co-operating pressure exerting surfaces shaped to impart to the quills lengthwise thereof the desired curl while the quills are in their raw or original condition whereby the quills are permanently curled without crushing or breaking thereof or previously removing the pith therefrom, means for heating the feathers while under pressure, and means for continuously feeding one or both of said surfaces.

ELIAS AMKRAUT.